US012630301B2

(12) United States Patent
Yeckel et al.

(10) Patent No.: US 12,630,301 B2
(45) Date of Patent: May 19, 2026

(54) SYSTEMS AND METHODS FOR CONFIRMING FLIGHT CALCULATIONS FOR AN AIRCRAFT

(71) Applicant: THE BOEING COMPANY, Arlington, VA (US)

(72) Inventors: Andrew J. Yeckel, Seattle, WA (US); Drew Allen Leek, Highlands Ranch, CO (US); Brian Wilson, Denver, CO (US)

(73) Assignee: The Boeing Company, Arlington, VA (US)

( * ) Notice: Subject to any disclaimer, the term of this patent is extended or adjusted under 35 U.S.C. 154(b) by 101 days.

(21) Appl. No.: 18/635,195

(22) Filed: Apr. 15, 2024

(65) Prior Publication Data

US 2025/0319988 A1     Oct. 16, 2025

(51) Int. Cl.
B64D 43/00          (2006.01)
G05D 1/223          (2024.01)
G05D 101/15         (2024.01)

(52) U.S. Cl.
CPC .............. B64D 43/00 (2013.01); G05D 1/223 (2024.01); G05D 2101/15 (2024.01)

(58) Field of Classification Search
CPC .................................. G08G 5/30; G08G 5/32
See application file for complete search history.

(56) References Cited

U.S. PATENT DOCUMENTS

2012/0150366  A1 *   6/2012   Potagnik ............... G06F 11/184
                                                              701/3
2016/0125743  A1 *   5/2016   Shorter, Jr. .............. G08G 5/32
                                                              701/528
2020/0320884  A1 *  10/2020   Hillier ................. G06F 11/1641

* cited by examiner

*Primary Examiner* — Aaron L Troost
(74) *Attorney, Agent, or Firm* — Joseph M. Butscher; Carroll, Hoette & Butscher LLC

(57)          ABSTRACT

A system and a method include multiple user interfaces. Different sets of calculations for a flight of an aircraft are configured to be input through the user interfaces. A control unit is in communication with the different user interfaces. The control unit is configured to receive the different sets of calculations for the flight of the aircraft, and compare the different sets of calculations for the flight of the aircraft to determine presence of one or more discrepancies therebetween.

20 Claims, 5 Drawing Sheets

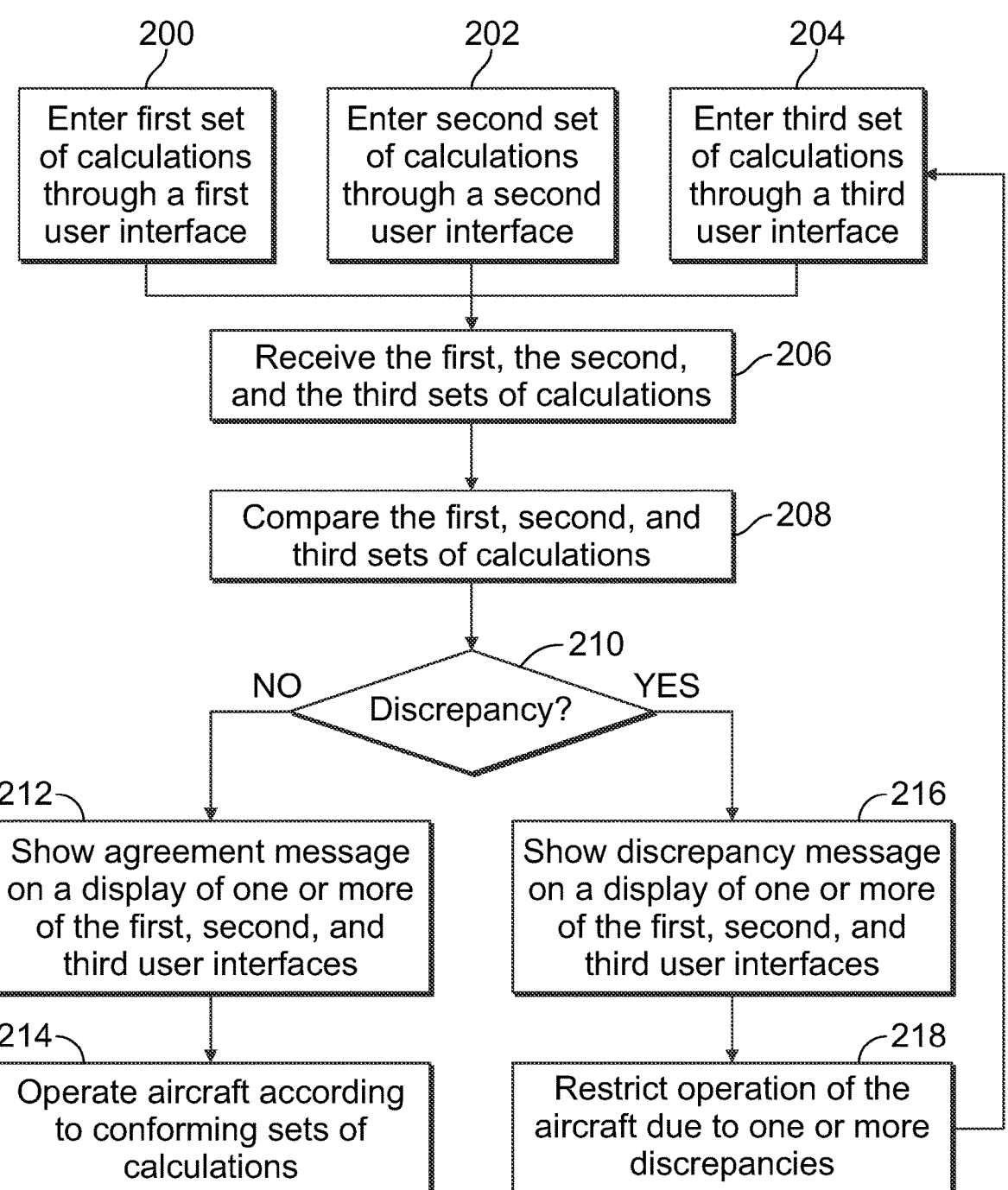

200

Enter first set of calculations through a first user interface

202

Enter second set of calculations through a second user interface

204

Enter third set of calculations through a third user interface

Receive the first, the second, and the third sets of calculations ~206

Compare the first, second, and third sets of calculations ~208

210

NO    Discrepancy?    YES

212

Show agreement message on a display of one or more of the first, second, and third user interfaces

216

Show discrepancy message on a display of one or more of the first, second, and third user interfaces

214

Operate aircraft according to conforming sets of calculations

218

Restrict operation of the aircraft due to one or more discrepancies

| 9:41 AM  Tue Oct 30th | ⏱ 100 ◻ |

PERFORMANCE - TAKEOFF - DISPATCH

PROFILE DC9_NEW_UIIUENKHF_This is a long name with tail... TAIL N023AZM999

| Airport Info | Add Airport | NOTAM ⓘ | MEL ⑧ | CDL | |

| ARPT | KDEN/DEN | - | - | TO | RTG |
| RWY | 16L | - | - | MAX | ATM |
| INTX | ALL | - | - | OPTIMUM | FLAP |
| COND | DRY | - | - | ENGINE | A/I |
| WIND | 120/13 NW | - | - | NO | IC |
| | ID HW/G XW KT | | | | |
| OAT | 20^0 | - | - | BALANCED | V1/VR |
| | 63°F | | | | |
| QNH | 29.8% IN HG | - | - | EXT 2ND SEG | PATH |
| | 1013.2 HPs | | | | |

| TOW | 345000 LB | ZFW | 250000 LB | CG (%) | 25.4 |

Calculate

Engine Failure Procedure:    ***SEE SPECIAL PROCEDURE
JUL-SEPT 2912                      FOR THIS RUNWAY***

| TKO Dispatch | TKO All Engine | Inflight | LDG Dispatch | LDG Enroute | WGT & Balance |

FIG. 3

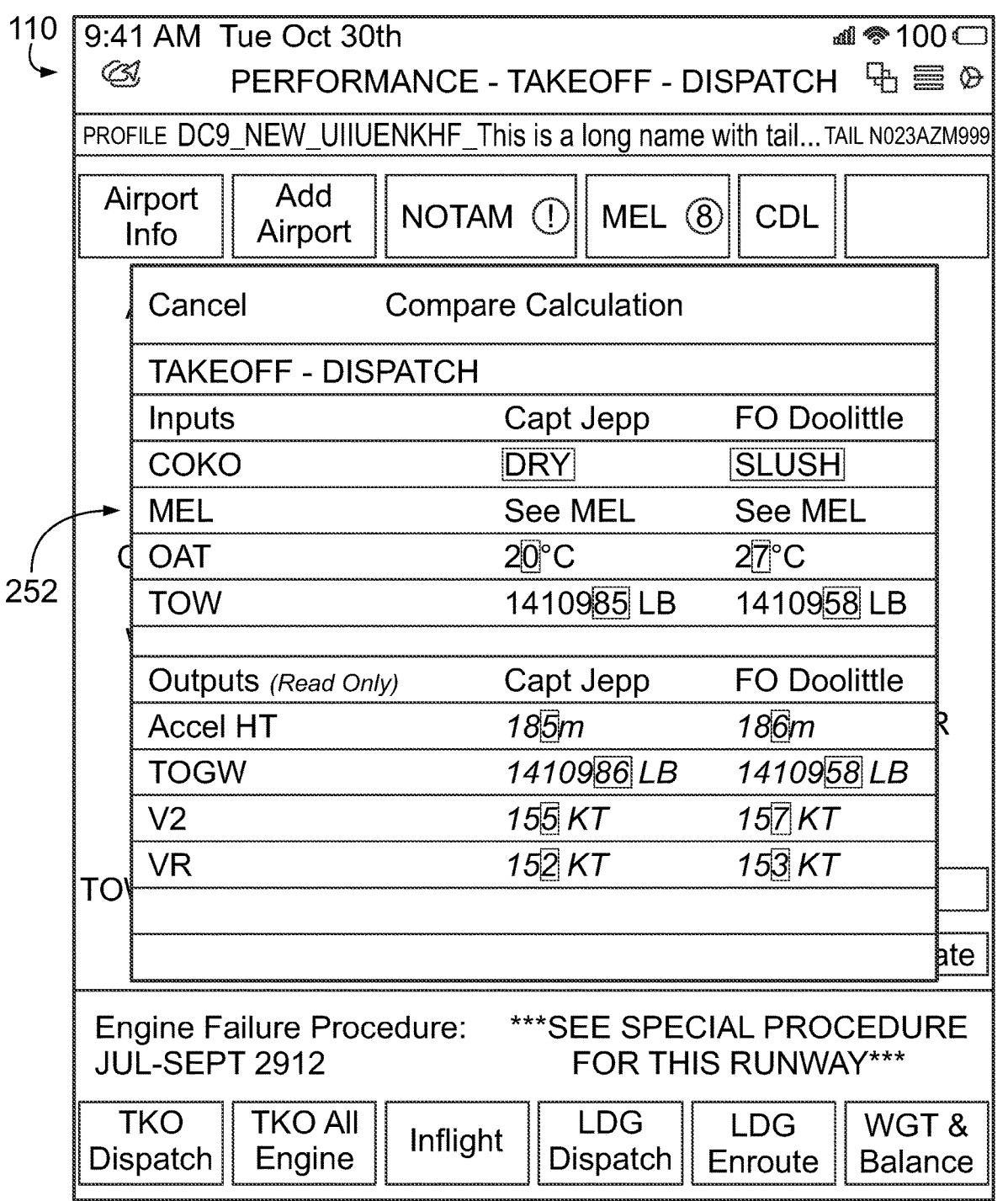

110

252

9:41 AM  Tue Oct 30th                                    📶 📶 100 🔋

⊠                PERFORMANCE - TAKEOFF - DISPATCH  🔲 ☰ ⊕

PROFILE DC9_NEW_UIIUENKHF_This is a long name with tail... TAIL N023AZM999

| Airport Info | Add Airport | NOTAM ⓘ | MEL ⑧ | CDL | |

| Cancel | Compare Calculation | |
|---|---|---|
| TAKEOFF - DISPATCH | | |
| Inputs | Capt Jepp | FO Doolittle |
| COKO | DRY | SLUSH |
| MEL | See MEL | See MEL |
| OAT | 20°C | 27°C |
| TOW | 1410985 LB | 1410958 LB |
| | | |
| Outputs *(Read Only)* | Capt Jepp | FO Doolittle |
| Accel HT | *185m* | *186m* |
| TOGW | *1410986 LB* | *1410958 LB* |
| V2 | *155 KT* | *157 KT* |
| VR | *152 KT* | *153 KT* |

TO\                                                              ate

Engine Failure Procedure:    \***SEE SPECIAL PROCEDURE
JUL-SEPT 2912              FOR THIS RUNWAY\***

| TKO Dispatch | TKO All Engine | Inflight | LDG Dispatch | LDG Enroute | WGT & Balance |

FIG. 4

SYSTEMS AND METHODS FOR CONFIRMING FLIGHT CALCULATIONS FOR AN AIRCRAFT

FIELD OF THE DISCLOSURE

Examples of the present disclosure generally relate to systems and methods for confirming flight calculations of pilots of an aircraft.

BACKGROUND OF THE DISCLOSURE

Aircraft are used to transport passengers and cargo between various locations. Numerous aircraft depart from and arrive at a typical airport every day.

For certain long haul flights (such as transoceanic flights), three or more pilots often operate an aircraft. Before such flights, the pilots make various calculations regarding aspects of different phases of flights. The pilots may then compare their calculations to ensure agreement of the independently determined calculations.

However, discrepancies may arise, such as if a pilot writes an incorrect number, erroneously calculates a figure, and/or the like. Typically, each pilot compares calculations with each of the other pilots to determine if there are any discrepancies with the calculations. As can be appreciated, the process of each pilot comparing calculations with all of the other pilots can be time consuming and tedious.

SUMMARY OF THE DISCLOSURE

A need exists for an improved system and method for comparing pilot calculations for a flight of an aircraft. Further, a need exists for an efficient and effective system and method for comparing flight calculations of multiple different pilots.

With those needs in mind, certain examples of the present disclosure provide a system including a first user interface having a first display and a first input device. A first set of calculations for a flight of an aircraft is configured to be input through the first input device. A second user interface has a second display and a second input device. A second set of calculations for the flight of the aircraft is configured to be input through the second input device. A third user interface has a third display and a third input device. A third set of calculations for the flight of the aircraft is configured to be input through the third input device. A control unit is in communication with the first user interface, the second user interface, and the third user interface. The control unit is configured to receive the first set of calculations for the flight of the aircraft, the second set of calculations for the flight of the aircraft, and the third set of calculations for the flight of the aircraft, and compare the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft.

In at least one example, the control unit is further configured to show the one or more discrepancies on one or more of the first display, the second display, or the third display. For example, the control unit is configured to show the one or more discrepancies on the first display, the second display, and the third display.

In at least one example, the first user interface, the second user interface, and the third user interface are within a flight deck of the aircraft. The control unit can be within an internal cabin of the aircraft.

In at least one example, the control unit is configured to simultaneously compare the first set of calculations for the flight of the aircraft, the second set of calculations for the flight of the aircraft, and the third set of calculations.

In at least one example, operation of the aircraft is restricted in response to the control unit determining the presence of the one or more discrepancies. As a further example, the control unit can be further configured to automatically operate one or more controls of the aircraft to restrict operation of the aircraft.

The control unit can be an artificial intelligence or machine learning system.

Certain examples of the present disclosure provide a method comprising receiving, by the control unit, the first set of calculations for the flight of the aircraft, the second set of calculations for the flight of the aircraft, and the third set of calculations for the flight of the aircraft; and comparing the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft.

Certain examples of the present disclosure provide an aircraft including a system, as shown, and described herein.

BRIEF DESCRIPTION OF THE DRAWINGS

FIG. 2 illustrates a flow chart of a method, according to an example of the present disclosure.

FIG. 3 illustrates a front view of a display showing parameters for a phase of a flight, according to an example of the present disclosure.

FIG. 4 illustrates a front view of the display showing discrepancies between different sets of calculations, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a system and a method configured to allow multiple pilots of an aircraft (such as three or more pilots) to compare flight calculations for a flight of the aircraft. The systems and methods described herein allow a flight crew to quickly understand in one instance if all of their calculations match, or if there are discrepancies that need to be addressed before or during a flight of the aircraft. If one or more discrepancies exist between calculations of different pilots, such discrepancies are shown on one or more displays to allow the pilots to view such discrepancies. In this manner, the flight crew is able to quickly, efficiently, and effectively resolve calculation conflicts.

Figure 1:
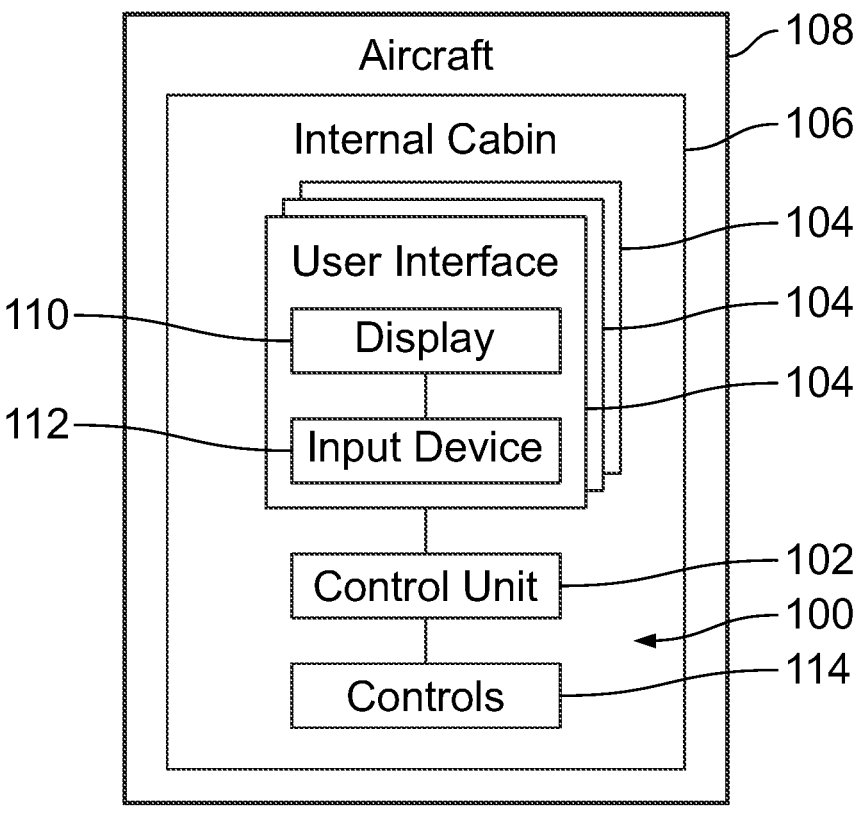
FIG. 1 illustrates a block diagram of a system, according to an example of the present disclosure.

FIG. 1 illustrates a block diagram of a system 100, according to an example of the present disclosure. The system 100 includes a control unit 102 in communication with three or more user interfaces 104 within an internal cabin 106 of an aircraft 108. In at least one example, the user interfaces 104 are within a flight deck or cockpit of the aircraft 108. Each user interface 104 is associated with a member of a flight crew, such as a pilot. For example, a first user interface 104 is associated with a first pilot, a second user interface 104 is associated with a second pilot, and a third user interface 104 is associated with a third pilot. The system 100 can include additional user interfaces 104 associated with additional members of a flight crew (such as a fourth user interface 104 associated with a fourth pilot, a fifth user interface 104 associated with a fifth pilot, and so on).

The control unit 102 is in communication with the user interfaces 104 through one or more wired or wireless connections. In at least one example, the control unit 102 is within the internal cabin 106. For example, the control unit 102 can be part of a flight computer within the flight deck or cockpit. As another example, the control unit 102 can be housed within one of the user interfaces 104. As another example, the control unit 102 is remote from the internal cabin 106. In at least one example, the control unit 102 is remote from the aircraft 108, such as within a computer workstation of a ground based monitoring center.

Each user interface 104 includes a display 110 and an input device 112. In at least one example, the display 110 is an electronic device configured to electronically show images, videos, text, and/or the like. For example, the display 110 is configured to electronically show flight calculations and discrepancies regarding the flight calculations, as described herein. The display 110 can be a monitor, screen, television, touchscreen, and/or the like. The input device 112 can include a keyboard, mouse, stylus, touchscreen interface (that is, the input device 112 can be integral with the display 110), and/or the like. The user interface 104 can be, or part of, a computer workstation. For example, the user interface 104 can be part of the flight computer within the flight deck or cockpit of the aircraft 108. As another example, the user interface 104 can be a handheld device, such as a smart phone, tablet, or the like.

In at least one example, the control unit 102 can be in communication with user interfaces 104 that are not onboard an aircraft 108, in addition to (or optionally instead of) the user interfaces 104 onboard the aircraft 108. For example, one or more user interface 104 can be at a land-based monitoring location, such as with respect to air traffic control, a flight dispatcher, an airline operations center, and/or the like.

The aircraft 108 includes controls 114 configured to allow an operator, such as the pilots, to control operation of the aircraft 108. For example, the controls 114 include one or more of a control handle, yoke, joystick, control surface controls, accelerators, decelerators, and/or the like.

In operation, each of the members of the flight crew enter calculations regarding one or more phases of a flight of the aircraft via an input device 112 of a user interface 104. For example, the first pilot enters a first set of flight calculations through an input device 112 of a first user interface 104. A second pilot enters a second set of flight calculations through an input device 112 of a second user interface 104. A third pilot enters a second set of flight calculations through an input device 112 of a third user interface 104. The flight calculations include input information regarding various aspects of one or more phases of a flight of the aircraft 108. In at least one example, the pilots enter the flight calculations before the flight of the aircraft 108. Examples of the calculations include a particular airport, a particular runway at an airport, conditions of the runway (such as dry or wet), wind conditions (such as direction and speed), engine type and engine number, wing flap conditions, weight of the aircraft, and the like. Such are examples of the types of calculations entered by the pilots. It is understood that such examples are non-limiting.

In response to the calculations being entered by the different pilots, the control unit 102 receives the multiple sets of calculations entered by the multiple different pilots through the different user interfaces 104. For example, the control unit 102 receives a first set of calculations from the first user interface 104, a second set of calculations from the second user interface 104, and a third set of calculations from the third user interface 104. After receiving the multiple sets of calculations from the different user interfaces 104, the control unit 102 automatically compares the different sets of calculations to determine if there are any discrepancies therebetween. In at least one example, the control unit 102 simultaneously compares the three or more sets of calculations, instead of comparing each set independently with respect to another set, such as in a round robin fashion. In this manner, the control unit 102 efficiently operates to conserve computing power.

If the different sets of calculations are in agreement (that is, there are no discrepancies therebetween), the control unit 102 outputs an agreement signal to the user interfaces 104 indicating that the different sets of calculations are in agreement. For example, the control unit 102 shows a message on the display 110 of one or more of the user interfaces 104 indicating that the sets of calculations are in agreement and that the aircraft 108 can be operated according to the conforming sets of calculations. As such, the controls 114 of the aircraft 108 can be operated according to the conforming sets of calculations to control the aircraft 108 during a flight. As another example, the controls 114 can be automatically operated, such as by the control unit 102 and/or a different control unit, to automatically operate the aircraft according to the conforming sets of calculations.

If, however, one or more discrepancies exists between two or more sets of the three or more calculations, the control unit 102 outputs a discrepancy signal to the user interfaces 104 indicating that there is at least one discrepancy in relation to the different sets of calculations. For example, the control unit 102 shows a message on the display 110 of one or more of the user interfaces indicating the existence of one or more discrepancies. The control unit 102 can show the one or more discrepancies within the different sets of calculations on the display 110. Upon viewing the discrepancies, the pilots can then quickly and easily check their calculations, and re-calculate until there are no discrepancies, or at least any existing discrepancies are within a tolerable level.

In at least one example, in response to determining the existence of one or more discrepancies, the control unit 102 may operate the controls 114, such as to restrict operation of the aircraft 108. For example, if one or more discrepancies exist, the control unit 102 may prevent operation of the engines of the aircraft 108 above a certain threshold. As another example, the control unit 102 may automatically operate brakes of the aircraft 108 to prevent the aircraft 108 from pushing back from a gate. As another example, the control unit 102 may automatically operate certain control surfaces of the aircraft 108 (such as wing flaps) to prevent the aircraft 108 from taking off. The control unit 102 may automatically operate the controls 114 of the aircraft 108 to restrict operation of the aircraft 108 until the different sets of calculations are in agreement with one another (such as there being no discrepancies therebetween). Optionally, the control unit 102 may not operate the controls 114 to restrict operation of the aircraft 108.

As described herein, the system 100 includes a first user interface 104 having a first display 110 and a first input device 112. A first set of calculations for a flight of the aircraft 108 is input through the first input device 112 (such as by a first pilot). A second user interface 104 has a second display 110 and a second input device 112. A second set of calculations for the flight of the aircraft 108 is input through the second input device 112 (such as by a second pilot). A third user interface 104 has a third display 110 and a third input device 112. A third set of calculations for the flight of the aircraft 108 is input through the third input device 112. The control unit 102 is in communication with the first user interface 104, the second user interface 104, and the third user interface 104. The control unit 102 is configured to receive the first set of calculations for the flight of the aircraft 108, the second set of calculations for the flight of the aircraft 108, and the third set of calculations for the flight of the aircraft 108. The control unit 102 is further configured to compare the first set of calculations for the flight of the aircraft 108, the second set of calculations for the flight of the aircraft 108, and the third set of calculations for the flight of the aircraft 108 to determine presence of one or more discrepancies between the first calculations for the flight of the aircraft 108, the second set of calculations for the flight of the aircraft 108, and the third set of calculations for the flight of the aircraft 108. In at least one example, the control unit 102 is further configured to show the one or more discrepancies on the first display 110, the second display 110, and/or the third display. In at least one example, the first user interface 104, the second user interface 104, and the third user interface 104 are within a flight deck of the aircraft 108.

FIG. 2 illustrates a flow chart of a method, according to an example of the present disclosure. Referring to FIGS. 1 and 2, at 200, a first pilot enters a first set of calculations for a flight of an aircraft 108 through a first user interface 104. At 202, a second pilot enters a second set of calculations for the flight of the aircraft 108 through the second user interface 104. At 204, a third pilot enters a third set of calculations for the flight of the aircraft 108 through the third user interface 104. In at least one example, each of the different sets of calculations include the same parameters for which values are input. For example, each of the different sets of calculations can include parameters such as airport, runway, runway conditions, weather conditions, wind conditions, and the like, for which the pilots enter a particular input value.

At 206, the control unit 102 receives the first set of calculations, the second set of calculations, and the third set of calculations. At 208, the control unit 102 then compares the first set of calculations, the second set of calculations, and the third set of calculations. In at least one example, the control unit 102 compares the different sets of calculations simultaneously (instead of comparing the first against the second, then the first against the third, then the second against the third, and the like). A 210, the control unit 102 determines if there are any discrepancies between the different sets of calculations.

If the control unit 102 determines there are no discrepancies between the different sets of calculations at 210, but instead the different sets of calculations are in agreement and conform with one another, the method proceeds to 212, at which the control unit 102 shows an agreement message on a display 110 of one or more of the first, second, and third user interfaces 104. In at least one example, the control unit 102 shows the agreement message on the display 110 of each of the different user interfaces 104. The method then proceeds from 212 to 214, at which the aircraft 108 is operated according to the conforming different sets of calculations (that is, the conforming first, set, and third sets of calculations).

If, however, the control unit 102 determines one or more discrepancies between the different sets of calculations at 210 (such as different input values for an airport, a runway, conditions, etc.), the method proceeds to 216, at which the control unit 102 shows a discrepancy message on the display 110 of one or more of the first, second, and third user interfaces 104. In at least one example, the control unit 102 shows the discrepancy message on the display 110 of each of the different user interfaces 104. The method then proceeds from 216 to 218, at which the control unit 102 restricts operation of the aircraft 108 (such as through automatic operation of one or more of the controls 114) due to the one or more detected discrepancies. The method may return to 200, 202, and 204 so that the discrepancies can be addressed and corrected.

FIG. 3 illustrates a front view of a display 110 showing parameters 250 for a phase of a flight, according to an example of the present disclosure. As an example, the phase can be takeoff. Examples of the parameters include an airport, a runway, conditions of the runway, wind, and total weight. A pilot enters input information for each of the parameters (such as "dry" for conditions). A set of calculations includes input values for all of the parameters. Referring to FIGS. 1 and 3, the control unit 102 can provide numerous parameters for input values on the display 110.

FIG. 4 illustrates a front view of the display 110 showing discrepancies 252 between different sets of calculations, according to an example of the present disclosure. For example, different sets of calculations can have discrepancies regarding runway conditions (dry and slush), air temperature, weight, and/or the like.

Referring to FIGS. 1-4, the different pilots can see the results of a comparison of the different sets of calculations on their respective displays 110 at the same time. As described herein, the systems and methods provide pilots with a holistic comparison view on their respective displays 110. The systems and methods substantially reduce time spent on individually comparing manual calculations. Further, the systems and methods provide a readily viewable comparison of the calculations, and lead to increased flight safety.

Figure 5:
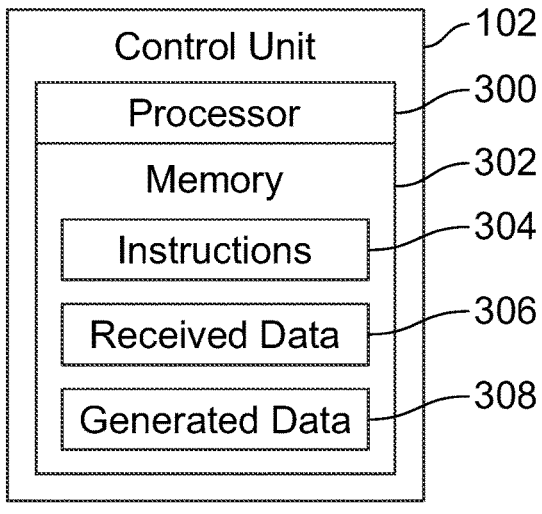
FIG. 5 illustrates a schematic block diagram of a control unit, according to an example of the present disclosure.

FIG. 5 illustrates a schematic block diagram of the control unit 102, according to an example of the present disclosure. In at least one example, the control unit 102 includes at least one processor 300 in communication with a memory 302.

The memory 302 stores instructions 304, received data 306, and generated data 308. The control unit 102 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 102 may be or include one or more processors that are configured to control operation, as described herein.

The control unit 102 is configured to execute a set of instructions that are stored in one or more data storage units or elements (such as one or more memories), in order to process data. For example, the control unit 102 may include or be coupled to one or more memories. The data storage units may also store data or other information as desired or needed. The data storage units may be in the form of an information source or a physical memory element within a processing machine.

The set of instructions may include various commands that instruct the control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

Referring to FIGS. 1-5, examples of the subject disclosure provide systems and methods that allow large amounts of data to be quickly and efficiently analyzed by a computing device. For example, the control unit 102 can receive and analyze data from numerous user interfaces 104 of different aircraft 108 over days, weeks, months, or years. As such, large amounts of data, which may not be readily discernable by human beings, are being tracked and analyzed. The vast amounts of data are efficiently organized and/or analyzed by the control unit 102, as described herein. The control unit 102 analyzes the data in a relatively short time in order to quickly and efficiently determine discrepancies within different sets of calculations for one or more flights of aircraft 108. As such, examples of the present disclosure provide increased and efficient functionality, and vastly superior performance in relation to a human being reviewing the vast amounts of data.

In at least one example, components of the system 100, such as the control unit 102, provide and/or enable a computer system to operate as a special computer system for determining discrepancies within different sets of calculations for a flight of an aircraft 108. The control unit 102 improves upon standard computing devices by determining such information and automatically communicating with individuals (such as operators of aircraft, ground support crew, flight attendants, and the like) in an efficient and effective manner.

In at least one example, the control unit 102 uses machine learning algorithms which automatically consider factors that influence calculations for a flight. In at least one example, all or part of the systems and methods described herein are or otherwise include an artificial intelligence (AI) or machine-learning system that can automatically perform the operations of the methods also described herein. In at least one example, the control unit 102 can be or otherwise include a deterministic or rules based evaluation system. In at least one example, the control unit 102 can be an artificial intelligence or machine learning system. These types of systems may be trained from outside information and/or self-trained to repeatedly improve the accuracy with how data is analyzed to determine and present the relevant information to users. For example, an AI control unit 102 can be trained to learn aspects and parameters, efficient changes in operational aspects, and the like, such as based on data received, tail-specific capabilities of aircraft, preferences, and habits of flight crew and/or ground crew, and/or the like. Over time, these systems can improve by determining and communicating with increasing accuracy and speed, thereby significantly reducing the likelihood of any potential errors. For example, the AI or machine-learning systems can learn and determine models, associate such models with received data, and determine potential conflicts. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determinations and communications described herein. The training minimizes conflicts and interference by performing an iterative training algorithm, in which the systems are retrained with an updated set of data, and based on the feedback examined prior to the most recent training of the systems. This provides a robust analysis model that can better determine and present discrepancies within different sets of calculations for a flight.

Figure 6:
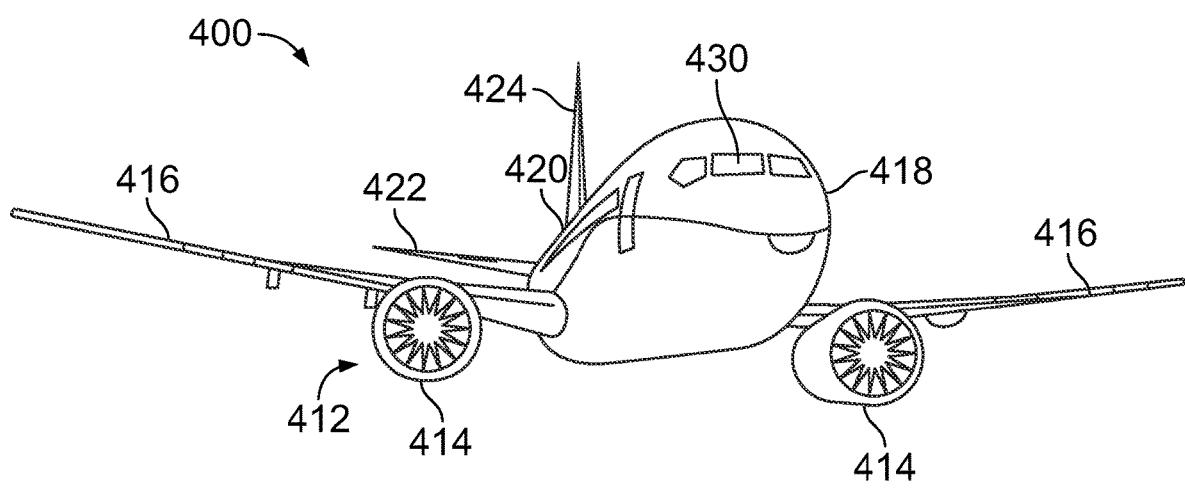
FIG. 6 illustrates a perspective front view of an aircraft, according to an example of the present disclosure.

FIG. 6 illustrates a perspective front view of an aircraft 108, according to an example of the present disclosure. The aircraft 108 includes a propulsion system 412 that includes engines 414, for example. Optionally, the propulsion system 412 may include more engines 414 than shown. The engines 414 are carried by wings 416 of the aircraft 108. In other examples, the engines 414 may be carried by a fuselage 418 and/or an empennage 420. The empennage 420 may also support horizontal stabilizers 422 and a vertical stabilizer 424. The fuselage 418 of the aircraft 108 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 6 shows an example of an aircraft 108. It is to be understood that the aircraft 108 can be sized, shaped, and configured differently than shown in FIG. 6.

Further, the disclosure comprises examples according to the following clauses:

Clause 1. A system comprising:
a first user interface having a first display and a first input device, wherein a first set of calculations for a flight of an aircraft is configured to be input through the first input device;
a second user interface having a second display and a second input device, wherein a second set of calculations for the flight of the aircraft is configured to be input through the second input device;
a third user interface having a third display and a third input device, wherein a third set of calculations for the flight of the aircraft is configured to be input through the third input device; and
a control unit in communication with the first user interface, the second user interface, and the third user interface, wherein the control unit is configured to:
receive the first set of calculations for the flight of the aircraft, the second set of calculations for the flight of the aircraft, and the third set of calculations for the flight of the aircraft, and
compare the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft.

Clause 2. The system of Clause 1, wherein the control unit is further configured to show the one or more discrepancies on one or more of the first display, the second display, or the third display.

Clause 3. The system of Clause 2, wherein the control unit is configured to show the one or more discrepancies on the first display, the second display, and the third display.

Clause 4. The system of any of Clauses 1-3, wherein the first user interface, the second user interface, and the third user interface are within a flight deck of the aircraft.

Clause 5. The system of any of Clauses 1-4, wherein the control unit is within an internal cabin of the aircraft.

Clause 6. The system of any of Clauses 1-5, wherein the control unit is configured to simultaneously compare the first set of calculations for the flight of the aircraft, the second set of calculations for the flight of the aircraft, and the third set of calculations.

Clause 7. The system of any of Clauses 1-6, wherein operation of the aircraft is restricted in response to the control unit determining the presence of the one or more discrepancies.

Clause 8. The system of Clause 7, wherein the control unit is further configured to automatically operate one or more controls of the aircraft to restrict operation of the aircraft.

Clause 9. The system of any of Clauses 1-8, wherein the control unit is an artificial intelligence or machine learning system.

Clause 10. A method for a system comprising:
a first user interface having a first display and a first input device, wherein a first set of calculations for a flight of an aircraft is configured to be input through the first input device;
a second user interface having a second display and a second input device, wherein a second set of calculations for the flight of the aircraft is configured to be input through the second input device;
a third user interface having a third display and a third input device, wherein a third set of calculations for the flight of the aircraft is configured to be input through the third input device; and
a control unit in communication with the first user interface, the second user interface, and the third user interface,
the method comprising:
receiving, by the control unit, the first set of calculations for the flight of the aircraft, the second set of calculations for the flight of the aircraft, and the third set of calculations for the flight of the aircraft; and
comparing the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft.

Clause 11. The method of Clause 10, further comprising showing, by the control unit, the one or more discrepancies on one or more of the first display, the second display, or the third display.

Clause 12. The method of Clauses 10 or 11, wherein said showing comprises showing the one or more discrepancies on the first display, the second display, and the third display.

Clause 13. The method of any of Clauses 10-12, wherein the first user interface, the second user interface, and the third user interface are within a flight deck of the aircraft, and wherein the control unit is within an internal cabin of the aircraft.

Clause 14. The method of any of Clauses 10-13, wherein said comparing comprises simultaneously comparing the first set of calculations for the flight of the aircraft, the second set of calculations for the flight of the aircraft, and the third set of calculations.

Clause 15. The method of any of Clauses 10-14, further comprising restricting operation of the aircraft in response to the control unit determining the presence of the one or more discrepancies.

Clause 16. The method of Clause 15, wherein said restricting comprises automatically operating, by the control unit, one or more controls of the aircraft.

Clause 17. An aircraft comprising:

an internal cabin including a flight deck;

a first user interface within the flight deck, the first user interface having a first display and a first input device, wherein a first set of calculations for a flight of an aircraft is configured to be input through the first input device;

a second user interface within the flight deck, the second user interface having a second display and a second input device, wherein a second set of calculations for the flight of the aircraft is configured to be input through the second input device;

a third user interface within the flight deck, the third user interface having a third display and a third input device, wherein a third set of calculations for the flight of the aircraft is configured to be input through the third input device; and a control unit within the internal cabin, the control unit in communication with the first user interface, the second user interface, and the third user interface, wherein the control unit is configured to:

receive the first set of calculations for the flight of the aircraft, the second set of calculations for the flight of the aircraft, and the third set of calculations for the flight of the aircraft, compare the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft, and show the one or more discrepancies on the first display, the second display, and the third display.

Clause 18. The aircraft of Clause 17, wherein the control unit is configured to simultaneously compare the first set of calculations for the flight of the aircraft, the second set of calculations for the flight of the aircraft, and the third set of calculations.

Clause 19. The aircraft of Clauses 17 or 18, wherein operation of the aircraft is restricted in response to the control unit determining the presence of the one or more discrepancies.

Clause 20. The aircraft of any of Clauses 17-19, wherein the control unit is further configured to automatically operate one or more controls of the aircraft to restrict operation of the aircraft.

As described herein, examples of the present disclosure provide improved systems and methods for comparing pilot calculations for a flight of an aircraft. Further, examples of the present disclosure provide efficient and effective systems and methods for comparing flight calculations of multiple different pilots.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a first user interface having a first display and a first input device, wherein a first set of calculations for a flight of an aircraft is configured to be input through the first input device;

a second user interface having a second display and a second input device, wherein a second set of calculations for the flight of the aircraft is configured to be input through the second input device;

a third user interface having a third display and a third input device, wherein a third set of calculations for the flight of the aircraft is configured to be input through the third input device; and a control unit in communication with the first user interface, the second user interface, and the third user interface, wherein the control unit is configured to:

receive the first set of calculations for the flight of the aircraft, the second set of calculations for the flight of the aircraft, and the third set of calculations for the flight of the aircraft, and simultaneously compare the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft, wherein operation of the aircraft is restricted in response to the control unit determining the presence of the one or more discrepancies.

2. The system of claim 1, wherein the control unit is further configured to show the one or more discrepancies on one or more of the first display, the second display, or the third display.

3. The system of claim 2, wherein the control unit is configured to show the one or more discrepancies on the first display, the second display, and the third display.

4. The system of claim 1, wherein the first user interface, the second user interface, and the third user interface are within a flight deck of the aircraft.

5. The system of claim 1, wherein the control unit is within an internal cabin of the aircraft.

6. The system of claim 1, wherein the control unit is further configured to automatically operate one or more controls of the aircraft to restrict operation of the aircraft.

7. The system of claim 6, wherein the control unit is configurated to automatically operate the controls of the aircraft to restrict the operation of the aircraft by preventing operation of the engines of the aircraft above a certain threshold.

8. The system of claim 6, wherein the control unit is configurated to automatically operate the controls of the aircraft to restrict the operation of the aircraft by automatically operating the brakes of the aircraft to prevent the aircraft from pushing back from a gate.

9. The system of claim 6, wherein the control unit is configurated to automatically operate the controls of the aircraft to restrict the operation of the aircraft by automatically operating one or more control surface of the aircraft to prevent the aircraft from taking off.

10. The system of claim 6, wherein the control unit is configured to automatically operate the control of the aircraft to restrict the operation of the aircraft until the first set of calculations for the flight of the aircraft, the second set of calculations for the flight of the aircraft, and the third set of calculations for the flight of the aircraft are in agreement with one another.

11. The system of claim 1, wherein the control unit is an artificial intelligence or machine learning system.

12. The system of claim 1, wherein each of the first set of calculations for the flight of the aircraft, the second set of calculations for the flight of the aircraft, and the third set of calculations for the flight of the aircraft comprises a particular airport, a particular runway at the airport, conditions of the runway at the airport, wind conditions, engine type, engine number, wing flap conditions, and weight of the aircraft.

13. A method for a system comprising:

a first user interface having a first display and a first input device, wherein a first set of calculations for a flight of an aircraft is configured to be input through the first input device;

a second user interface having a second display and a second input device, wherein a second set of calculations for the flight of the aircraft is configured to be input through the second input device;

a third user interface having a third display and a third input device, wherein a third set of calculations for the flight of the aircraft is configured to be input through the third input device; and a control unit in communication with the first user interface, the second user interface, and the third user interface, the method comprising:

receiving, by the control unit, the first set of calculations for the flight of the aircraft, the second set of calculations for the flight of the aircraft, and the third set of calculations for the flight of the aircraft;

simultaneously comparing the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft; and restricting operation of the aircraft in response to the control unit determining the presence of the one or more discrepancies.

14. The method of claim 13, further comprising showing, by the control unit, the one or more discrepancies on one or more of the first display, the second display, or the third display.

15. The method of claim 13, wherein said showing comprises showing the one or more discrepancies on the first display, the second display, and the third display.

16. The method of claim 13, wherein the first user interface, the second user interface, and the third user interface are within a flight deck of the aircraft, and wherein the control unit is within an internal cabin of the aircraft.

17. The method of claim 13, wherein said restricting comprises automatically operating, by the control unit, one or more controls of the aircraft.

18. The method of claim 13, wherein each of the first set of calculations for the flight of the aircraft, the second set of calculations for the flight of the aircraft, and the third set of calculations for the flight of the aircraft comprises a particular airport, a particular runway at the airport, conditions of the runway at the airport, wind conditions, engine type, engine number, wing flap conditions, and weight of the aircraft.

19. An aircraft comprising:

an internal cabin including a flight deck;

a first user interface within the flight deck, the first user interface having a first display and a first input device, wherein a first set of calculations for a flight of an aircraft is configured to be input through the first input device;

a second user interface within the flight deck, the second user interface having a second display and a second input device, wherein a second set of calculations for the flight of the aircraft is configured to be input through the second input device;

a third user interface within the flight deck, the third user interface having a third display and a third input device, wherein a third set of calculations for the flight of the aircraft is configured to be input through the third input device; and a control unit within the internal cabin, the control unit in communication with the first user interface, the second user interface, and the third user interface, wherein the control unit is configured to:

receive the first set of calculations for the flight of the aircraft, the second set of calculations for the flight of the aircraft, and the third set of calculations for the flight of the aircraft, simultaneously compare the first set of calculations for the flight of the aircraft, the second set of calculations for the flight of the aircraft, and the third set of calculations for the flight of the aircraft to determine presence of one or more discrepancies between the first calculations for the flight of the aircraft, the second set of calculations for the flight of the aircraft, and the third set of calculations for the flight of the aircraft, and show the one or more discrepancies on the first display, the second display, and the third display, wherein operation of the aircraft is restricted in response to the control unit determining the presence of the one or more discrepancies.

20. The aircraft of claim 19, wherein the control unit is further configured to automatically operate one or more controls of the aircraft to restrict operation of the aircraft.

\* \* \* \* \*